United States Patent [19]

Chang et al.

[11] Patent Number: 4,773,484

[45] Date of Patent: Sep. 27, 1988

[54] ENHANCED OIL RECOVERY PROCESS WITH REDUCED GAS DRIVE MOBILITY

[75] Inventors: Harry L. Chang; James G. Kralik, both of Dallas, Tex.

[73] Assignee: Atlantic Richfield Company, Los Angeles, Calif.

[21] Appl. No.: 29,829

[22] Filed: Mar. 24, 1987

[51] Int. Cl.$^4$ ............................................. E21G 43/22
[52] U.S. Cl. .................................. 166/274; 166/273; 166/275; 252/8.554
[58] Field of Search ....................... 166/273, 274, 275; 252/8.554

[56] References Cited

U.S. PATENT DOCUMENTS

| | | | |
|---|---|---|---|
| 3,318,379 | 5/1967 | Bond et al. | 166/273 |
| 3,342,256 | 9/1967 | Bernard et al. | 166/273 |
| 3,348,611 | 10/1967 | Reisberg | 166/274 X |
| 3,366,174 | 1/1968 | Ferrell et al. | 166/273 |
| 3,446,282 | 5/1969 | Cooke, Jr. | 166/274 |
| 3,599,715 | 8/1971 | Roszelle | 166/273 |
| 3,605,891 | 9/1971 | Ayers, Jr. | 166/273 |
| 3,648,772 | 3/1972 | Earlougher, Jr. | 166/273 |
| 3,653,440 | 4/1972 | Reisberg | 166/273 |
| 3,759,325 | 9/1973 | Gogarty | 166/273 |
| 3,885,626 | 5/1975 | Gale et al. | 166/273 |
| 3,885,628 | 5/1975 | Reed et al. | 166/273 X |
| 4,452,708 | 6/1984 | Aldrich et al. | 252/8.554 |
| 4,608,204 | 8/1986 | Lew et al. | 252/8.554 X |

*Primary Examiner*—George A. Suchfield
*Attorney, Agent, or Firm*—Michael E. Martin; Frank J. Uxa

[57] ABSTRACT

A process for recovering crude oil from a subterranean formation comprising injecting into the formation a liquid solution consisting essentially of at least one surfactant such as alkyl toluene sulfonate in an aqueous medium and injecting a gas to displace the movable oil effectively toward a production well. The process is advantageous in formations where temperatures preclude effective oil recovery using micellar/polymer chemical floods.

8 Claims, No Drawings

ENHANCED OIL RECOVERY PROCESS WITH REDUCED GAS DRIVE MOBILITY

BACKGROUND OF THE INVENTION

1. Field of the Invention

This invention relates to an improved process for recovery of hydrocarbons from a porous formation or reservoir. More particularly, the invention relates to an improved enhanced oil recovery process for recovery of hydrocarbons from a porous reservoir which involves injecting a surfactant solution and a gaseous fluid into the reservoir.

2. Background

A large portion of the original oil in place in many oil-bearing subterranean formations remains in place after primary production and waterflooding. As oil reserves dwindle and exploration for new discoveries becomes more difficult and costly, the use of enhanced oil recovery techniques on previously discovered resources will play an increasingly important role in the overall production of crude petroleum.

One enhanced oil recovery (EOR) technique involves injection into the formation of slugs of a micellar fluid followed by a polymer drive fluid. The micellar fluids are aqueous solutions which contain surfactants at relatively high concentrations above the critical micelle concentration. Polymers, such as polysaccharides and partially hydrolyzed polyacrylamides, develop aqueous phase viscosities that provide stable displacement through the formation with reduced bypassing of the surfactant fluid bank. Field experience with the technique has been disappointing under some reservoir conditions. Poor performance of these fluids can be traced back to the fact that, because of the cost of these systems, the micellar/polymer fluids can be injected only in slugs, rather than continuously, if economic recovery of crude oil is to be achieved. The slug size is generally limited to less than about 20% of the reservoir pore volume, for example. Also, the integrity of the slug is weakened by numerous factors, including high formation temperatures (e.g., greater than about 200° F.) and shear forces which have a deleterious effect on the polymers currently being used.

Another concern in using the micellar/polymer fluids is driving fluid mobility. Often a driving fluid, e.g., water, is used to drive the micellar/polymer fluids through the reservoir or formation. Care must be exercised to avoid the driving fluid by-passing the micellar fluid bank, sometimes referred to in the art as "fingering". The driving fluid should push the micellar fluid through the formation toward the production well or wells. Mobility control of the driving fluid provides for effective "pushing" action and reduces by-passing. Such mobility control has been difficult to achieve, with the result that the driving fluid often "breaks through" the slugs of micellar fluid as it sweeps through the formation toward the production well or wells. U.S. Pat. No. 3,648,772 to R. C. Earlougher, for example, uses a combination of foam and a liquid mobility buffer slug to provide mobility control for a micellar dispersion, including a hydrocarbon and a surfactant in an aqueous medium.

SUMMARY OF THE INVENTION

The present invention provides an improved process for recovery of hydrocarbons from a subterranean formation or reservoir using a surfactant solution and a gaseous fluid which are injected into the formation to drive hydrocarbons to one or more production wells.

The present invention also provides an improved hydrocarbon recovery process comprising injecting a micellar fluid and a gaseous fluid simultaneously or in alternating slugs of micellar fluid and gas for reservoirs wherein the reservoir temperatures are too high for suitable use of a polymer type drive fluid.

In accordance with an important aspect of the present invention, there is provided a hydrocarbon recovery process in which a hydrocarbon sulfonate, in particular, an alkyl toluene sulfonate, is provided in a concentration in an aqueous medium in the range of about 0.10% to about 1.00% of the total liquid composition on a weight basis, and is injected with or followed by the injection of a gaseous fluid to provide enhanced mobility control, particularly in reservoirs at temperatures greater than 150 F. to 200 F. Advantageously, the gas may be a relatively inexpensive one such as air, nitrogen or field gas, for example. The process is particularly advantageously used in situations wherein a micellar fluid and polymer fluid type flooding process would otherwise be considered. Accordingly, the problems associated with mixing the polymer fluids at the surface, polymer adsorption by the reservoir and polymer degradation under higher reservoir temperatures are avoided.

Those skilled in the art will recognize the above-described advantages and superior features of the present invention as well as other aspects thereof upon reading the detailed description which follows.

DESCRIPTION OF PREFERRED EMBODIMENTS

An improved process for recovering hydrocarbons from a subterranean hydrocarbon-bearing formation having at least one injection means, e.g., an injection well, in fluid communication with at least one production means, e.g., a production well, has been discovered. In one broad aspect, the process comprises: (a) injecting into the formation, preferably through the injection means, a liquid consisting essentially of at least one surfactant and an aqueous medium having a composition according to the invention; (b) injecting into the formation, preferably through the injection means, a gaseous fluid to urge the liquid solution toward the production means; provided the surfactant is present in the liquid solution in an amount effective to inhibit or reduce the mobility of the mixture of the gaseous fluid and the surfactant solution as it flows through the formation; and (c) recovering hydrocarbon from the formation through the production means.

The present process has been found to provide for improved recovery of hydrocarbons, e.g., crude petroleum, from subterranean formations. This improved EOR process is relatively inexpensive and cost effective for hydrocarbon recovery. For example, a wide variety of gases may be used as the gaseous fluid and water, brackish water or brine may be used as the aqueous medium. The process may include injecting a further drive fluid, such as water, behind the slug or slugs of micellar fluid and gas.

Although the present liquid solution is preferably injected into the formation as micellar slugs, the surfactant or surfactants in the liquid solution are present in an amount effective to inhibit or reduce, preferably to control, the mobility of the mixture of the gaseous and liquid media through the formation. Since the surfactants are generally temperature and shear resistant (relative to the conventional polymer fluids), these materials are useful and effective under relatively severe, e.g., high temperature and pressure, formation conditions.

Many suitable gases may be used in the present process. The gas can be substantially insoluble (or have a relatively low saturation level) in the liquid solution at the conditions present in the formation. Preferably, the gas is selected from the group consisting of methane, ethane, propane, natural gas, nitrogen, air, combustion flue gas, carbon dioxide and mixtures thereof. Because of availability and cost considerations, the more preferred gaseous fluid is selected from the group consisting of methane, ethane, propane (liquified petroleum gas), natural gas and mixtures thereof. In certain situations, nitrogen, air and carbon dioxide perform in the present invention at least as well as natural gas. If combustion flue gases are to be used as the gaseous fluid, a limited amount of natural gas (or its components) or crude petroleum (or its components) can be used to generate the gaseous medium for injection. The power generated from this combustion can be used to operate the EOR process.

It is contemplated that the surfactant may be selected from at least some of those surface active agents useful in other EOR processes, such as the EOR process involving the use of micellar/polymer fluids. The concentration of the surfactant or surfactants in the presently useful liquid solution may be at least equal to the critical micelle concentration of such agents found in conventional micellar/polymer fluids and preferably should be greater than the critical micelle concentration. Depending on the type of surfactant used, critical micelle concentrations of surfactant should be in the range of 0.05% to 0.20% of the total liquid composition on a weight basis. The concentration of the surfactant or surfactants in the presently useful liquid solution is preferably in the range of about 0.10% to about 1.00%, on a weight basis, of the total fluid composition.

Surfactants believed to be useful in the present invention may be nonionic, cationic or anionic in nature. Included among the surfactants which it is believed can be employed in the present process are alkyl pyridium salts, fatty acid sulfates of alkali and alkaline earth metals; ammonium, alkali and alkaline earth metal sulfonates (including overhead sulfonates); glycosides, fatty acides salts of alkali and alkaline earth metals, quaternary ammonium salts and the like and mixtures thereof. One preferred class of surfactants useful in the present invention are substantially hydrocarbon sulfonates, substantially hydrocarbon sulfonate derivatives and mixtures thereof, more preferably having about 10 to about 40 carbon atoms per molecule. Such sulfonates may be derived from petroleum fractions using conventional and well known processes and are, therefore, sometimes referred to as petroleum sulfonates.

Alkyl aryl sulfonates and alkyl aryl naphthenic sulfonates, and in particular alkyl aryl sulfonates, having about 10 to about 40, more preferably about 15 to about 35, carbon atoms per molecule provide excellent results. Alkyl toluene sulfonate has been found to be an excellent surfactant for the process contemplated by the present invention because of its thermal stability and as long as it is used with a water or brine medium having relatively low salt concentrations. Each molecule of the surfactant may contain one, two or more of the functional groups, e.g., a sulfonate group. Sodium and ammonium alkyl aryl sulfonates, derivatives thereof and mixtures thereof are also preferred surfactants for use in the present invention. The term sulfonate derivatives is meant to include those entities which include at least a sulfonate group or sulfonate groups which are formed from one or more of the presently useful surfactants. Overbased sulfonates, such as those produced in accordance with conventional processes are included as sulfonate derivatives.

The term "substantially hydrocarbon" is meant to include hydrocarbon groups, and hydrocarbon groups including minor amounts of other elements, such as oxygen, sulfur, phosphorous and the like which do not have an undue detrimental effect on the functioning of the sulfonate or sulfonate derivative in the present process. Of course, the sulfonates may be present as ammonium or metal (e.g., alkali and alkaline earth metal) sulfonates. An aliphatic ethoxy sulfate such as one produced under the trademark ALIPAL by GAF, Inc. may also be useful in high salinity brines at formation temperatures less than about 150° F.

The liquid solution is preferably injected into the formation in slugs, more preferably as slugs with a surfactant concentration in excess of its critical micelle concentration. The relative volumes of aqueous surfactant solution and gaseous fluid injected into the formation may vary and, preferably, the volume of surfactant solution injected into the formation is similar to the minimum volume of micellar fluids typically injected in a micellar/polymer flooding type process wherein, in such processes, the surfactant is present in the liquid solution in a range of about 1% to 10% of the total on a weight basis. The size of the individual slugs of aqueous surfactant solution injected in accordance with the present invention is dependent on the number of slugs injected and preferably range up to about 10%, more preferably up to about 5%, of the formation or reservoir pore volume. The total amount of liquid surfactant solution injected should be about 25% of the formation pore volume (including the pore volume occupied by recoverable hydrocarbons). The total amount of gaseous medium injected is also dependent on the number of injection steps and may range up to about 100% or more of the formation or reservoir pore volume, based on the volume of the gaseous fluid at the conditions present in the formation or reservoir. The rate of gas and liquid injection into the formation or reservoir is preferably such that the liquid-gas mixture sweeps or moves through the formation or reservoir at a substantially constant velocity, i.e., distance per unit time, in a given location.

The following non-limiting example illustrates certain of the advantages of the present invention.

EXAMPLE

A subterranean crude petroleum-bearing, porous reservoir sample was produced, using conventional primary recovery methods, until it was determined that enhanced oil recovery methods were needed to effectively and economically produce the sample further.

Seawater (brine) was injected into the sample and a quantity of crude petroleum recovered. This waterflood/crude petroleum recovery was continued until it was determined that additional enhanced oil recovery would be needed to effectively and economically produce a reservoir further, based on the test sample.

A combination of brine and about one percent (1.0%) by weight (based on the total liquid composition) of a commercially available sodium alkylated toluene sulfonate containing 23 carbon atoms per molecule and known to be useful as a surfactant in micellar/polymer fluid EOR systems, was prepared. This combination was injected into the reservoir sample simultaneously with a gas in amounts so that a total of about 100% by volume of the gas and liquid (based on the volume of gas at the conditions present in the reservoir) was injected. A further quantity of crude petroleum was economically recovered based on the costs of the injected fluids and injection conditions.

The use of the present EOR process does not require that the porous reservoir be previously waterflooded or subjected to any other EOR process. Good results are obtained if the present process is used on a reservoir directly after primary recovery methods are used. It is contemplated that in certain situations, the present process may be employed without first using such primary production techniques.

While this invention has been described with respect to various specific examples and embodiments, it is to be understood that the invention is not limited thereto and that it can be variously practiced within the scope of the following claims.

What we claim is:

1. A process for recovering crude oil from a subterranean formation at temperature above about 200° F. and having at least one injection means in fluid communication with at least one production means comprising:
   (a) injecting into said formation a liquid solution consisting essentially of at least one surfactant and an aqueous medium wherein said surfactant is selected from the group consisting of substantially hydrocarbon sulfonates, substantially hydrocarbon sulfonate derivatives and mixtures thereof and said surfactant is present in an amount at least equal to the critical micelle concentration and in the range of about 0.10% to 1.0%, on a weight basis, of said liquid solution;
   (b) injecting a gas to urge said solution toward said production means, provided that the surfactant is present in an amount effective to reduce the mobility of the mixture of said gas and said solution through said formation; and
   (c) recovering crude oil from said formation through said production means.

2. The process of claim 1 wherein:
   said surfactant is present in an amount in excess of the critical micelle concentration.

3. The process set forth in claim 1 wherein:
   said surfactant comprises alkyl toluene sulfonate.

4. The process of claim 1 wherein:
   said gas is selected from the group consisting of Methane, ethane, propane, natural gas, nitrogen, air, combustion flue gas, carbon dioxide and mixtures thereof.

5. The process of claim 2 wherein:
   said gas is selected from the group consisting of methane, ethane, propane, natural gas, nitrogen, air, combustion flue gas, carbon dioxide and mixtures thereof.

6. The process of claim 3 wherein:
   said gas is selected from the group consisting of methane, ethane, propane, natural gas, nitrogen, air, combustion flue gas, carbon dioxide and mixtures thereof.

7. A process for recovering crude oil from a subterranean formation having a nominal temperature of about 200° F. or greater, said formation also having at least one injection means in fluid communication with at least one production means, said process comprising:
   (a) injecting into said formation a liquid solution comprising a surfactant including a quantity of alkyl toluene sulfonate in an aqueous medium, said surfactant being present in an amount at least equal to the critical micelle concentration and in the range of about 0.1% to 1.0%, on a weight basis, of said liquid solution;
   (b) injecting simultaneously with said liquid solution a gaseous fluid selected from the group consisting of methane, ethane, propane, natural gas, nitrogen, air, combustion flue gas, carbon dioxide and mixtures thereof to urge the mixture of said liquid solution and said gaseous fluid toward said production means; and
   (c) recovering crude oil from said formation through said production means.

8. The process set forth in claim 7 wherein:
   the total volume of said liquid solution and said gaseous drive fluid injected into said formation is about 100% of formation pore volume at formation conditions of temperature and pressure.

* * * * *